Norman E. Rohan
INVENTOR.

Nov. 22, 1949     N. E. ROHAN     2,488,831
TRACTION WHEEL FOR TRACTORS OR THE LIKE

Filed June 17, 1948     2 Sheets-Sheet 2

Norman E. Rohan
INVENTOR.

BY *(signatures)*
Attorneys

Patented Nov. 22, 1949

2,488,831

UNITED STATES PATENT OFFICE 2,488,831

TRACTION WHEEL FOR TRACTORS OR THE LIKE

Norman E. Rohan, Inez, Tex.

Application June 17, 1948, Serial No. 33,479

6 Claims. (Cl. 301—51)

The present invention relates to new and useful improvements in traction wheels and other motor vehicles and more particularly to an emergency or accessory traction wheel which may be attached in position to the usual drive wheel of the tractor.

An important object of the invention is to provide a traction wheel of this character including a plurality of retractable lugs to provide traction for the tractor when travelling over soft or muddy ground, or through snow.

A further object of the invention is to provide double sets of retractable lugs for use in providing the necessary traction when the vehicle is travelling forwardly or rearwardly.

Another object of the invention is to provide spring means for holding the lugs in a projected position and connecting a pair of the lugs at substantially diametrically opposite sides of the wheels to each other whereby to utilize a single spring for holding a pair of the lugs in a projected position.

Another object is to provide a device of this character of simple and practical construction, which is efficient and reliable in use, easy to attach in position to a tractor wheel without necessitating any changes or alterations in the construction of the tractor and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
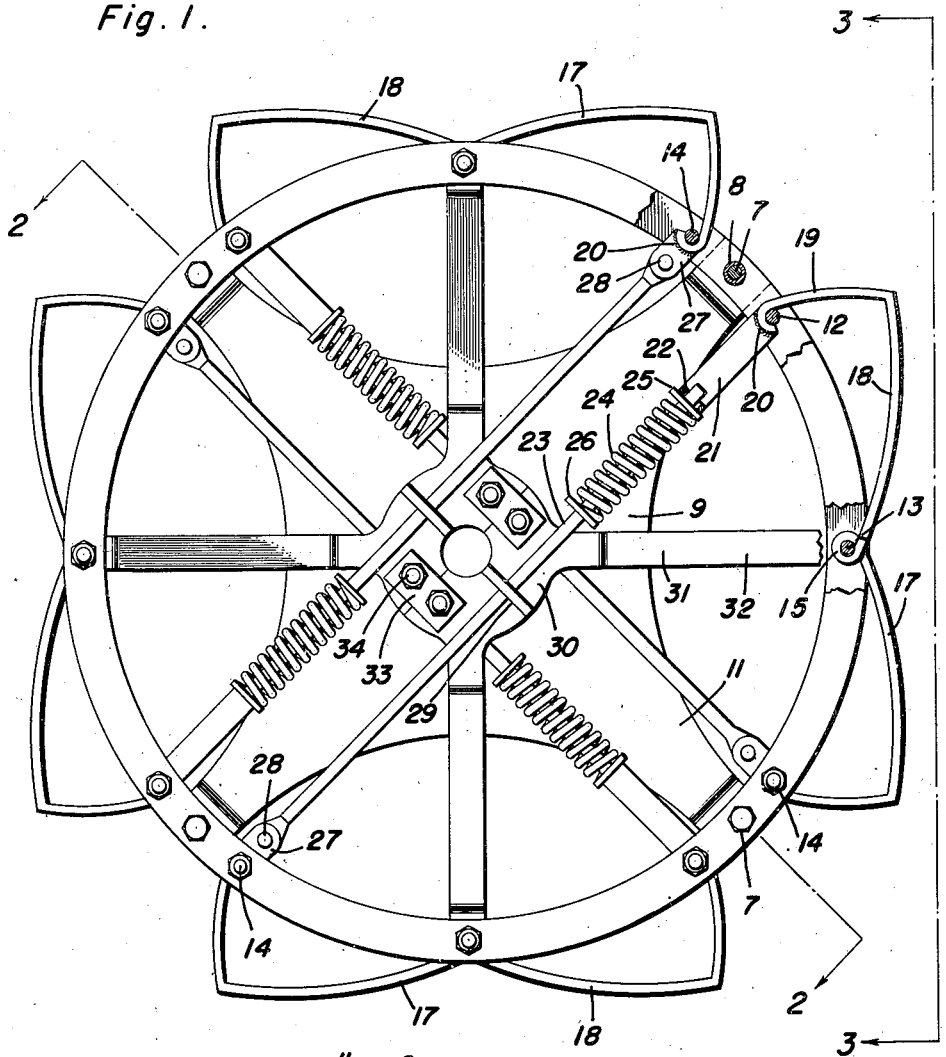
Figure 1 is a side elevational view.
Figure 4:
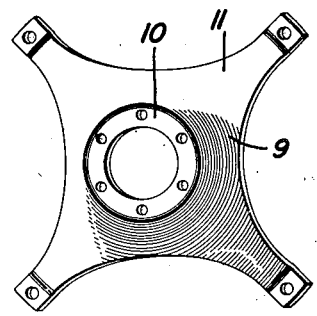
Figure 4 is a perspective view of the attaching plate for attaching the emergency wheel to the tractor wheel.

Referring now to the drawings in detail wherein for the purpose of illustration I have disclosed a preferred embodiment of the invention, the numerals 5 and 6 designate inner and outer rings forming the rim of the emergency traction wheel, the rings being connected to each other in spaced apart relation by transverse bolts 7 having spacing sleeves 8 thereon positioned between the rings.

Figure 2:
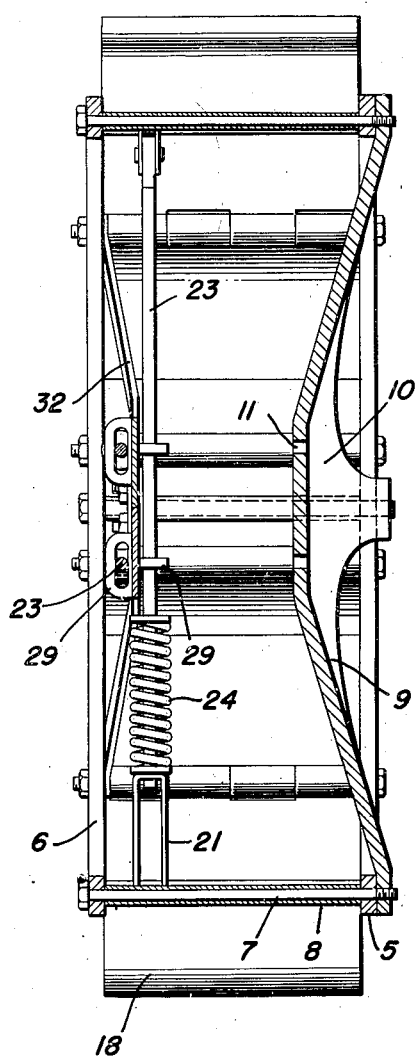
Figure 2 is a transverse sectional view taken substantially on a line 2—2 of Figure 1.
Figure 3:
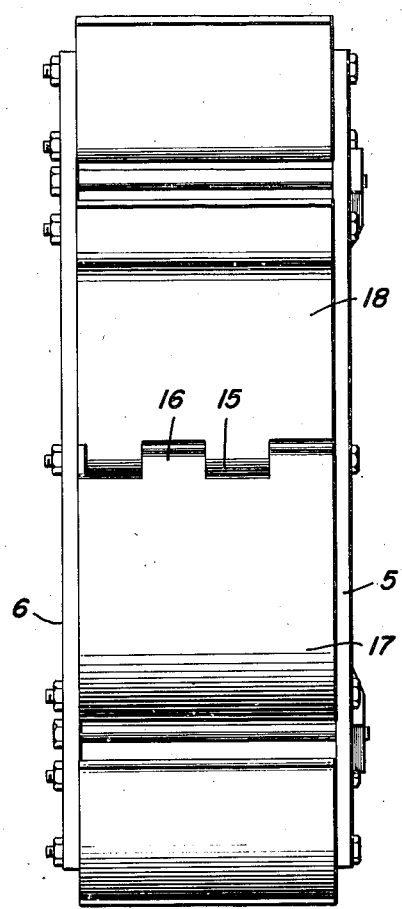
Figure 3 is an end elevational view.

An attaching plate 9 includes a hub portion 10 and spokes 11, the spokes having their end portions secured to the inner ends of the bolts 7 outwardly of the inner ring 5 and with the hub portion 10 recessed inwardly at the side of the accessory wheel adjacent the inner ring 5 as shown in Figure 2 of the drawings. The hub portion 10 is formed with bolt attaching openings 11 by means of which the attaching plate 9 is secured to the hub of a tractor wheel or other vehicle and with the inner ring 5 positioned closely against the tractor wheel.

The accessory traction wheel is also provided with groups of bolts or rods 12, 13 and 14 positioned transversely between the rings 5 and 6, the bolt 13 of each group providing a pivot for the rolled hinge bearings 15 and 16 at the inner ends of pairs of forward and reversing lugs 17 and 18.

The lugs 17 and 18 are constructed of rigid sheet metal plates having the bearings 15 and 16 formed at one end and extending in circumferentially opposite directions from the pivot bolt 13. The portions of the lugs adjacent the bearings 15 and 16 are curved corresponding substantially to the radius of rings 5 and 6 and positioned between said rings while the opposite ends of the lugs project substantially radially inwardly in an arc as shown at 19 and formed at their inner ends with hook shaped lips 20 engaged respectively behind the bolts 12 and 14.

The lip 20 of lug 18 is welded between the outer end portions of a U-shaped guide 21 having an opening 22 at its bight portion in which one end of a rod 23 is slidably received. A coil spring 24 is positioned between washers 25 and 26 on rod 23, the washer 25 bearing against the inner ends of U-shaped guide 21 and the washer 26 being fixed to the rod 23.

The other end of rod 23 extends toward a substantially diametrically opposite side of the wheel and is connected to the lip 20 at the inwardly projecting end of the lug 17 of a second pair of the lugs by means of a pair of spaced parallel apertured ears 27 welded to the lip and to which the adjacent end of rod 23 is pivotally attached by means of a pin 28.

Accordingly the lug 17 which may be designated for providing traction for the vehicle during its forward movement is connected to one of the lugs 18 by the rod 23 and the spring 24 carried by the rod projects both of the connected lugs 17 and 18 outwardly of the periphery of the wheel, it being apparent that only one of said connected lugs being in engagement with the ground during rotation of the wheel. The lug 18 is used to provide traction when the vehicle is travelling in a rearward or reverse direction. When one of the connected lugs provides traction for the wheel its adjacent advance lug is retracted to a position inwardly of the periphery of the wheel when said last named lug comes into contact with the ground. In this manner the lug which is retracted will enable the rim of the wheel to ride on the surface of the ground and thus enable the following traction lugs to penetrate into the ground by reason of its angle of approach and thus provide the necessary traction for the wheel.

The rods 23 for the connected pairs of lugs 17 and 18 are slidable at their central portions in guides 29 carried at the hub portion 30 of a spider 31 which includes spokes 32 attached at their outer ends to the ring 6 by means of the bolts 13.

The spider 31 may be of a sectional construction as shown in Figure 1 of the drawings and with the hub portion of each section connected together by means of plates 33 and bolts and nuts 34.

Also as indicated in Figure 2 of the drawings certain of the guides 29 are positioned inwardly of the hub 30 of the spider and the remaining guides 29 are positioned outwardly of the hub of the spider to prevent interference of the action of the rods 23 with each other.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An emergency traction wheel comprising a pair of rings, means securing the rings to each other in spaced parallel relation to each other, transverse members extending between the rings, and traction lugs pivoted to said transverse members for retracting movement between the rings, said lugs being arranged in pairs with one end pivoted to a common transverse member and extending circumferentially in opposite directions therefrom to form forward and reverse traction lugs respectively, the other ends of said lugs projecting substantially radially inwardly between the rings, and spring means holding the lugs in projected position beyond the periphery of the rings.

2. An emergency traction wheel comprising a pair of rings, means securing the rings to each other in spaced parallel relation to each other, transverse members extending between the rings, and traction lugs pivoted to said transverse members for retracting movement between the rings, said lugs being arranged in pairs with one end pivoted to a common transverse member and extending circumferentially in opposite directions therefrom to form forward and reverse traction lugs respectively, the other ends of said lugs projecting substantially radially inwardly between the rings, spring means holding the lugs in projected position beyond the periphery of the rings, and an attaching plate carried by one of the rings for attaching the emergency wheel to a vehicle wheel.

3. An emergency traction wheel comprising a pair of rings, means securing the rings to each other in spaced parallel relation to each other, transverse members extending between the rings, and traction lugs pivoted to said transverse members for retracting movement between the rings, said lugs being arranged in pairs with one end pivoted to a common transverse member and extending circumferentially in opposite directions therefrom to form forward and reverse traction lugs respectively, the other ends of said lugs projecting substantially radially inwardly between the rings, and means connecting the forward traction lug of one pair to the reverse traction lug of another pair and including spring means common to said connected lugs for holding the lugs in a projected position beyond the periphery of the rings.

4. An emergency traction wheel comprising a pair of rings, means securing the rings to each other in spaced parallel relation to each other, transverse members extending between the rings, and traction lugs pivoted to said transverse members for retracting movement between the rings, said lugs being arranged in pairs with one end pivoted to a common transverse member and extending circumferentially in opposite directions therefrom to form forward and reverse traction lugs respectively, the other ends of said lugs projecting substantially radially inwardly between the rings, and means connecting one of the lugs of one pair to an opposite lug of another pair and including a rod pivoted at one end to one of the connected lugs and slidably engaged at its other end with the other of said connected lugs, and spring means carried by the rod and holding both of said connected lugs in a projected position beyond the periphery of the rings.

5. An emergency traction wheel comprising a pair of rings, means securing the rings to each other in spaced parallel relation to each other, transverse members extending between the rings, and traction lugs pivoted to said transverse members for retracting movement between the rings, said lugs being arranged in pairs with one end pivoted to a common transverse member and extending circumferentially in opposite directions therefrom to form forward and reverse traction lugs respectively, the other ends of said lugs projecting substantially radially inwardly between the rings, and means connecting one of the lugs of one pair to an opposite lug of another pair and including a rod pivoted at one end to one of the connected lugs and slidably engaged at its other end with the other of said connected lugs, a spider secured to one of the rings, a guide carried by the spider for the rod, and spring means carried by the rod and holding both of said connected lugs in a projected position beyond the periphery of the rings.

6. An emergency traction wheel comprising a pair of rings, means securing the rings to each other in spaced parallel relation to each other, transverse members extending between the rings and traction lugs pivoted to said transverse members for retracting movement between the rings, said lugs being arranged in pairs with one end pivoted to a common transverse member and extending circumferentially in opposite directions therefrom to form forward and reverse traction lugs respectively, the other ends of said lugs projecting substantially radially inwardly between the rings, hooks at the inwardly projecting ends of the lugs engaging adjacent transverse rods to limit outward projecting movement of the lugs, and spring means holding the lugs in projected position beyond the periphery of the rings.

NORMAN E. ROHAN.

No references cited.